| United States Patent [19] | [11] | 4,370,310 |
|---|---|---|
| Walker | [45] | Jan. 25, 1983 |

[54] ZINC ALUMINATE PREPARED USING AN ALUMINA HYDRATE

[75] Inventor: Darrell W. Walker, Bartlesville, Okla.

[73] Assignee: Phillips Petroleum Company, Bartlesville, Okla.

[21] Appl. No.: 276,594

[22] Filed: Jun. 23, 1981

[51] Int. Cl.³ ............................................. C01F 7/02
[52] U.S. Cl. ................................................. 423/600
[58] Field of Search ......................... 423/600; 252/463

[56] References Cited

U.S. PATENT DOCUMENTS

| 2,269,508 | 1/1942 | Barton | 423/600 |
| 2,556,280 | 6/1951 | Kearby | 423/600 |
| 2,623,020 | 12/1952 | Gilbert | 423/600 |
| 3,627,674 | 12/1971 | Nagl | |
| 3,668,151 | 6/1972 | Walker | 252/463 |
| 3,948,808 | 4/1976 | Box et al. | 423/600 |
| 4,256,722 | 3/1981 | Carrier | 423/600 |

FOREIGN PATENT DOCUMENTS

| 656549 | 1/1965 | Belgium | 423/600 |
| 1415400 | 3/1964 | France | 423/600 |
| 1229669 | 10/1968 | United Kingdom | 423/600 |
| 565875 | 1/1975 | U.S.S.R. | 423/600 |

*Primary Examiner*—Herbert T. Carter

[57] ABSTRACT

A strong zinc aluminate is prepared by first wetting a particulate alumina hydrate with a dilute acid to form a paste. Particulate zinc oxide is then added to the resulting paste. The mixture of alumina hydrate and zinc oxide is then dried and calcined to form zinc aluminate.

6 Claims, No Drawings

ZINC ALUMINATE PREPARED USING AN ALUMINA HYDRATE

This invention relates to a method for preparing a strong zinc aluminate using an alumina hydrate.

Zinc aluminate has been found to be useful as a catalyst or as a catalyst support in a number of catalytic reactions. Zinc aluminate for use in catalytic reactions is generally prepared by reacting zinc oxide at elevated temperatures with a catalytic form of an alumina such as chi, gamma or eta. Flame hydrolyzed aluminas have been particularly preferred in the past. The reaction is typically carried out by intimately mixing the dry oxides, wetting with either water or dilute acid to form a paste, extruding the resulting paste, drying the extrudate and calcining at a temperature in the range of about 1500 to about 2000° F.

Alumina hydrates are less expensive than catalytic forms of alumina and thus there would be cost advantages to using alumina hydrates to form the zinc aluminate. However, zinc aluminate prepared in the past using alumina hydrates is generally too weak (e.g., low crush strength) to withstand usage in a commercial reactor. It is thus an object of this invention to provide a method for preparing strong zinc aluminate using an alumina hydrate so as to improve the economics of processes which utilize zinc aluminate as a catalyst or catalyst support.

In accordance with the present invention, zinc aluminate is prepared by first wetting particulate alumina hydrate with a dilute acid to form a paste. Particulate zinc oxide is then added to the resulting paste. After drying and calcining, the thus formed zinc aluminate has approximately twice the crush strength of zinc aluminate prepared from an alumina hydrate where the alumina hydrate and zinc oxide are mixed prior to wetting with a dilute acid.

Other objects and advantages of the invention will be apparent from the foregoing brief description of the invention and the claims as well as the detailed description of the invention which follows.

Any suitable particulate zinc oxide may be utilized to prepare the zinc aluminate. The particulate zinc oxide should generally have an average particle diameter in the range of about 0.1 to about 1000 micrometers and will more typically have an average particle diameter in the range of about 40 to about 900 micrometers.

Any suitable particulate alumina hydrate may be utilized in preparing the zinc aluminate. The alumina hydrate utilized should have a high purity to avoid contamination of the zinc aluminate with undesired material such as metals. The most commonly known forms of alumina hydrates are alpha trihydrate, alpha monohydrate, beta trihydrate, and beta monohydrate. A particularly preferred form of alumina hydrate is the alpha monohydrate which is also known as boehmite because high purity boehmite can be obtained and other forms of alumina hydrate have a tendency to transform to boehmite as temperature is increased. The particle size of the alumina will generally range from about 0.1 to about 200 micrometers.

Any suitable acid may be utilized to form a paste from the alumina hydrate. Particularly preferred acids are nitric acid and organic acids. Sulfuric acid and hydrochloric acid may be utilized but might leave undesirable contaminants in the zinc aluminate. The preferred organic acids are formic, acetic, propionic and butyric. Organic acids having higher numbers of carbon atoms are difficult to dissolve in water and thus are not preferred.

To form zinc aluminate in accordance with the present invention, the particulate alumina hydrate is wetted with a dilute acid to form a paste. The particulate zinc oxide is then added directly to the thus formed paste. Methyl cellulose may also be added with the zinc oxide to improve the porosity of the finished zinc aluminate. The resulting mixture of zinc oxide and alumina hydrate is then subjected to a shaping operation such as extrusion or pelleting to form the paste into a desired shape. The shaped paste is then dried and calcined to form zinc aluminate. If methyl cellulose is added to the paste, the methyl cellulose is combusted during calcining. The space left by the combusted methyl cellulose improves the porosity of the finished zinc aluminate.

The dilute acid utilized to wet the alumina hydrate may have any suitable concentration. The acid concentration is preferably in the range of about 0.1 to about 2.5 molar with a concentration in the range of about 0.5 to about 1.0 molar being most preferred.

Any suitable length of time may transpire between the time that the alumina hydrate is wetted with the dilute acid and the time the zinc oxide is added to the resulting paste. It is desirable to allow a time of at least about 15 minutes to transpire to effect the necessary physical changes in the alumina. Longer times such as overnight do not have any adverse effects.

Any suitable ratio of zinc oxide to alumina hydrate may be utilized. The composition of pure zinc aluminate is 44.38 weight percent zinc oxide and 55.62 weight percent alumina. Presence of alumina in concentrations greater than the stoichiometric is undesirable because it imparts acid properties that impair the selectivity of the catalyst. Concentration of zinc oxide in the zinc aluminate can range up to about 46 weight percent. This would cause the concentration of alumina to decrease to about 54 weight percent. The paste of zinc oxide and alumina hydrate may be treated in any desired manner to provide a desired physical shape. Extrusion or pelleting are the most common treatments but the zinc aluminate may be formed into other physical shapes if desired. If the paste is extruded, the paste should be dried promptly to prevent the extrudate from coalescing. The paste may be dried at temperatures in the range of about 100° C. to about 150° C. for times in the range of about 10 minutes to about 100 minutes depending on the size of the extrudate or other physical shape in which the paste has been formed.

Any suitable amount of methyl cellulose may be added to the paste if desired. However, since crush strength wll be generally reduced as the porosity is increased by the use of methyl cellulose, care should be taken to not use methyl cellulose to the extent that the crush strength of the zinc aluminate is reduced below a point where the zinc aluminate will not be usable for its intended purpose.

After drying, the mixture of zinc oxide and alumina hydrate may be calcined in any suitable manner to form zinc aluminate. The calcining temperature may be in the range of about 600° to about 1500° C. for times in the range of about 0.1 to about 30 hours with the longer times being required for lower temperatures. Preferably, the calcining temperature will be in the range of about 800° to about 1200° C. for times in the range of about 1 to about 30 hours. The zinc aluminate may be effectively formed by calcining the mixture of zinc oxide and alumina hydrate at a temperature of about 1000° C. for about 16 hours.

The calcination is preferably carried out in the presence of free oxygen in order to ensure that undesired impurities such as carbon are removed. The calcination may be carried out in an inert atmosphere if desired but a reducing atmosphere should be avoided.

The following example is presented in further illustration of the invention.

EXAMPLE

Eight preparations of zinc aluminate were made using boehmite alumina hydrate and French Process zinc oxide. For catalysts A, B and C the alumina hydrate was placed in a Sigma mixer and wetted with a dilute acid to form a paste. After wetting, the paste was allowed to sit for at least fifteen minutes and the zinc oxide and methyl cellulose, if used, was then added to the paste. The zinc oxide and alumina hydrate were then mixed unitl a paste consistency suitable for extrusion was attained. The resulting paste was then extruded to one-sixteenth inch extrudate in a hydraulic extruder. The extrudate was dried at 121° C. in a forced draft oven and then calcined in air in a muffle furnace at a temperature in the range of 820° C. to 870° C. to form zinc aluminate.

Catalysts D-H were prepared in the same manner as previously described with the exception that the alumina hydrate, zinc oxide and methyl cellulose were intimately mixed prior to wetting with the dilute acid or wetting with water.

The quantity of the ingredients used to form the zinc aluminate preparations is set forth in TABLE 1.

TABLE I

| PRE-PARA-TION | Al₂O₃ (g) | ZnO (g) | METHYL CELLULOSE | WET-TING AGENT | ACID CONCEN-TRATION |
|---|---|---|---|---|---|
| A | 239 | 208 | None | HNO₃ | 0.7 M |
| B | 175 | 152 | 2 | HNO₃ | 0.7 M |
| C | 175 | 152 | 2 | HOAc | 0.6 M |
| D | 175 | 152 | 2 | HNO₃ | 1.0 M |
| E | 263 | 227 | 3 | H₂O | None |
| F | 263 | 265 | 6.4 | H₂O | None |
| G | 263 | 265 | 3.2 | HOAc | 0.8 M |
| H | 263 | 265 | 6.4 | HNO₃ | 0.8 M |

Crush strength of preparations A-H were measured by a device consisting of a hammer and anvil having circular one-eight inch diameter parallel faces. A particle of extrudate was placed between the faces and force was applied gradually until the particle of extrudate was crushed. The force was recorded on a dial gauge. Generally, about 25 observations were made per preparation. The results of the crush strength test in addition to other measurements made on the preparations are set forth in TABLE II. Blanks in Table II indicate that measurements were not taken.

TABLE II

| PREPARATION | CRUSH STRENGTH (lbs) | PORE VOLUME (cc/g) | BULK DENSITY Cg(cc) |
|---|---|---|---|
| A | 5.9 | 0.30 | 1.07 |
| B | 4.7 | 0.28 | 1.02 |
| C | 5.0 | 0.30 | 1.15 |
| D | 2.6 | 0.30 | 1.07 |
| E | <1.0 | — | 0.96 |
| F | 0.7 | — | — |
| G | 1.3 | — | — |
| H | 0.9 | 0.32 | 1.02 |

It is apparent from TABLE II that the crush strength of the zinc aluminate prepared in accordance with the present invention is generally at least double that of the zinc aluminate prepared by wetting a mixture of zinc oxide and alumina hydrate.

Reasonable variations and modifications are possible within the scope of the disclosure and the appended claims to the invention.

That which is claimed is:

1. A method for preparing zinc aluminate comprising the steps of:
   wetting particulate alumina hydrate with a suitable dilute acid to form a first paste;
   mixing particulate zinc oxide with said first paste to form a second paste; and
   calcining said second paste to form said zinc aluminate.

2. A method in accordance with claim 1 wherein said alumina hydrate is alpha monohydrate having an average particle diameter in the range of about 0.1 to about 200 micrometers, said zinc oxide has an average particle diameter in the range of about 0.1 to about 1000 micrometers, and said suitable dilute acid is selected from the group consisting of nitric acid, formic acid, acetic acid, propionic acid and butyric acid.

3. A method in accordance with claim 2 wherein a time of at least about 15 minutes is allowed to transpire between the time that said first paste is formed and the time that said zinc oxide is mixed with first paste to form said second paste and wherein said second paste is calcined at a temperature in the range of about 600° to about 1500° C. for times in the range of about 0.1 to about 30 hours.

4. A method in accordance with claim 2 wherein a time of at least about 15 minutes is allowed to transpire between the time that said first paste is formed and the time that said zinc oxide is mixed with said first paste to form said second paste and wherein said second paste is calcined at a temperature in the range of about 800° to about 1200° C. for times in the range of about 1 to about 30 hours.

5. A method in accordance with claim 1 wherein the amount of zinc oxide present in said zinc aluminate is in the range of about 44.38 weight percent to about 46 weight percent based on the weight of the zinc aluminate and wherein the amount of alumina present in the zinc aluminate is in the range of 54 weight percent to about 55.62 weight percent based on the weight of the zinc aluminate.

6. A method in accordance with claim 1 wherein said second paste is extruded to form said second paste into a desired shape prior to calcining said second paste to form said zinc aluminate.

* * * * *